US012356049B2

United States Patent
Matz

(10) Patent No.: US 12,356,049 B2
(45) Date of Patent: Jul. 8, 2025

(54) SYSTEM AND METHOD FOR PLAYING A SUBTITLES FILE SEPARATELY FROM A MULTIMEDIA CONTENT FILE

(71) Applicant: Somplo LTD., Petah Tikva (IL)

(72) Inventor: Nadav Matz, Rosh HaAyin (IL)

(73) Assignee: Somplo LTD., Petah Tikva (IL)

(*) Notice: Subject to any disclaimer, the term of this patent is extended or adjusted under 35 U.S.C. 154(b) by 0 days.

(21) Appl. No.: 18/234,921

(22) Filed: Aug. 17, 2023

(65) Prior Publication Data

US 2024/0089555 A1  Mar. 14, 2024

(30) Foreign Application Priority Data

Sep. 12, 2022 (IL) .......................................... 296415

(51) Int. Cl.
*H04N 21/488* (2011.01)
(52) U.S. Cl.
CPC ............................. *H04N 21/4884* (2013.01)

(58) Field of Classification Search
CPC .................................................. H04N 21/4884
See application file for complete search history.

(56) References Cited

U.S. PATENT DOCUMENTS

| 9,633,696 B1* | 4/2017 | Miller | G11B 27/031 |
| 2003/0012558 A1* | 1/2003 | Kim | G11B 27/34 |
| | | | 386/E9.036 |
| 2012/0254467 A1* | 10/2012 | Kasper | H04L 67/02 |
| | | | 709/246 |

* cited by examiner

*Primary Examiner* — Yassin Alata
(74) *Attorney, Agent, or Firm* — Rivka Friedman

(57) ABSTRACT

The subject matter discloses a computer-implemented method, comprising: converting a subtitle file into a data structure file, the subtitle file being associated with a multimedia content file; receiving a request for playing multimedia content; as a result of said request converting the data structure file into an HTML code; and synchronizing a playing of the multimedia content file with an activating of said HTML code.

7 Claims, 5 Drawing Sheets

00:00:00,000 --> 00:00:01,700  This is first subtitle of the media content — 501

```
[ {
"start_time":"00:00:00,000",
"end_time": "00:00:01,700",
"content": "This is first <strong>subtitle</strong> of the media content",    "design":{    "color":"#000000",
"top":"50%",    "left":"50%",    "fontSize":"22px",    } }]
```
— 502

FIGURE 5

SYSTEM AND METHOD FOR PLAYING A SUBTITLES FILE SEPARATELY FROM A MULTIMEDIA CONTENT FILE

FIELD OF THE INVENTION

The present disclosure relates to multimedia content in general, and to videos, in particular.

BACKGROUND OF THE INVENTION

Multimedia content files are files that are used for playing media content. An example for multimedia content file is a video file which includes video and audio data, subtitles data and metadata.

An example of a video file format is the MP4 format. MP4 is short for "MPEG-4 Part 14," and is a container format that can store video, audio, subtitle, and image data in separate tracks. Each track, or data stream, may be encoded with different codecs.

SUMMARY OF THE INVENTION

One exemplary embodiment of the disclosed subject matter is a computer-implemented method, comprising converting a subtitle file into a data structure file, the subtitle file being associated with a multimedia content file; receiving a request for playing multimedia content; as a result of the request converting the data structure file into an HTML code; and synchronizing a playing of the multimedia content file with an activating of the HTML code.

According to some embodiments the multimedia content file does not include subtitles. According to some embodiments the method further comprising receiving a request for amending a property of a subtitle associated with the multimedia content and, as a result of the request amending the data structure file. According to some embodiments the amending being while the media content is being played. According to some embodiments the subtitle file being an SRT file and wherein the structure file.

The term computing device refers herein to a device that includes a processing unit. Examples for such device are a personal computer, a laptop, a server, a wearable device, a tablet a cellular device and IOT (internet of things) device.

The term multimedia content file refers herein to an audio file, a video file and image sequence. Example of video file format is the MP4 file format.

The term subtitle file refers herein to a file that includes subtitles and time stamps for playing the subtitles simultaneously with the multimedia content. Examples are SRT (SubRipSubtitle), SSA (SubStation Alpha), TTML (Timed Text Markup Language), DFXP (Distribution Format Exchange Profile), VTT (Web Video Text Track) and TXT (untimed text transcript).

The term properties of a subtitle refers herein to fonts, timer code, color, position, font size and or other characteristics.

The term data structure file refers herein to a file that includes data in a certain structure. Examples of such files are JSON file, Java script object and XML.

The term time code refers to a sequence of numeric codes generated at regular intervals by a timing synchronization system for synchronizing multimedia content, for example, for synchronizing a video with subtitles.

In some aspects of the present invention relates to a non-transitory computer-readable medium comprising instructions which when executed by at least one processor causes the processor to perform the method of the present invention.

One technical problem dealt with by the present disclosure is how to change properties of the subtitle without the need to imprint the subtitle in the multimedia content file. Imprinting the subtitle in the multimedia content file is a cumbersome operation and is not useful in a design phase where there is a need to a rapid change in the properties of the subtitle for matching the best subscriber.

Methods known in the art embed (imprint) the subtitle in the multimedia content file and, thus, do not provide the option to change property of the subtitle while the video is playing or without the imprinting operation.

One technical solution is separating the subtitles from the multimedia content file, inserting the subtitles content into a separate editable file such that the subtitles can be synchronized with the multimedia content when playing the content.

Such a solution enables the designer to change properties of the subtitle by editing the separate file without the need to imprint the subtitles in the multimedia content file. The subtitles can be edited before playing the multimedia content or while the multimedia content is being played.

Such a solution enables, inter alia, to dynamically locate the subtitles outside of the multimedia content area. Such locating overcomes the problem of multimedia content that is played in a small area where there is not enough room for subtitles to be present in a sufficient size. A small area can be for example 1920 on 1080 displayed a s 970 pixels on 550 pixels or smaller.

Embodiments of the invention may be implemented as a computer process (method), a computing system, or as an article of manufacture, such as a computer program product or a non-transitory computer-readable media. The computer program product may be a computer storage media readable by a computer system and encoding a computer program of instructions for executing a computer process on the computer and network devices. The computer program product may also be a propagated signal on a carrier readable by a computing system and encoding a computer program of instructions for executing a computer process.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

Figure 3A:
Figure 3B:
Figure 4:
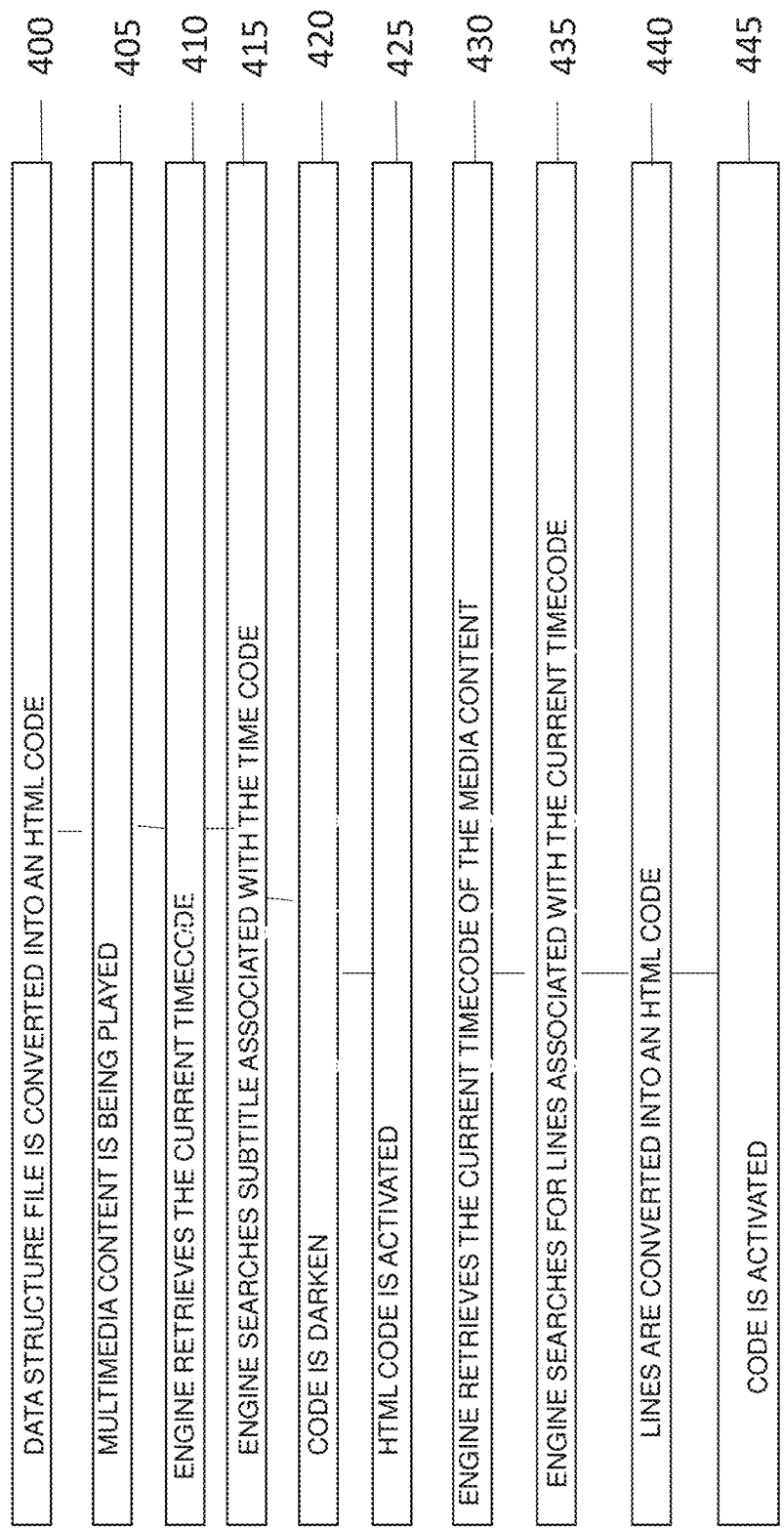

FIG. 3A shows an exemplary scene of a played video before changing a property of the subtitle, in accordance with some exemplary embodiments of the subject matter, and FIG. 3B shows an exemplary scene of a played video after changing a property of the subtitle, in accordance with some exemplary embodiments of the subject matter; and FIG. 4 shows a flowchart diagram of the method for converting a data structure file into an HTML code, in accordance with some exemplary embodiments of the subject matter; and FIG. 5 shows exemplary lines of data structure file and corresponding lines in JSON object, in accordance with some exemplary embodiments of the subject matter.

DETAILED DESCRIPTION

Figure 1:
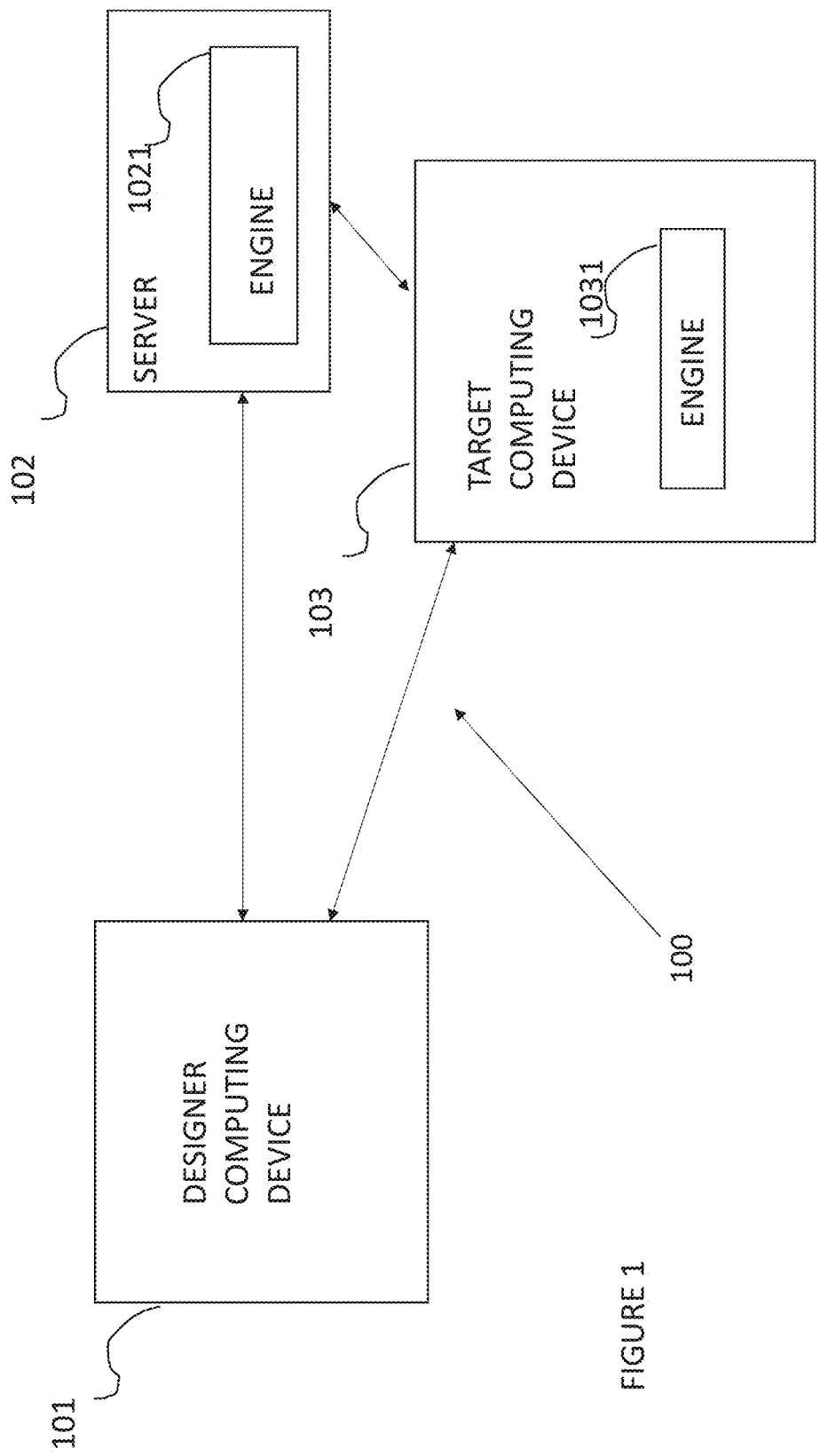
FIG. 1 shows a block diagram of an environment for separating subtitle data from the multimedia content file, in accordance with some exemplary embodiments of the subject matter.

FIG. 1 shows a block diagram of an environment for separating subtitles from the video file, in accordance with some exemplary embodiments of the subject matter.

Environment 100 includes a designer computing device 101, a server 102 and a target computing device 103.

The server 102 is configured for uploading multimedia content files and a subtitle file from the designer computing device 102 upon a request from the designer to change the properties of the subtitle.

The server 102 includes an Engine 1021. Engine 1021 converts the subtitle file into data structure format. In one example the server converts the SRT file into a JSON file. In some embodiments the designer computing device 102 functions as a server.

The designer computing device 101 is configured for editing the data structure files according to a request from the designer.

The target computing device 103 is configured for synchronizing the playing of the multimedia content file with the playing of the subtitles. The target computing device 103 converts the data structure file into an HTML code and for synchronizing the playing of the multimedia content file with the HTML code. The multimedia content file does not include subtitles.

The target computing device 103 includes an engine 1033. The engine 1033 is configured for converting the data structure file into an HTML code and for synchronizing the playing the multimedia content file with the HTML code. The method for converting the data structure file into an HTML code is explained in greater details in FIG. 4.

Figure 2:
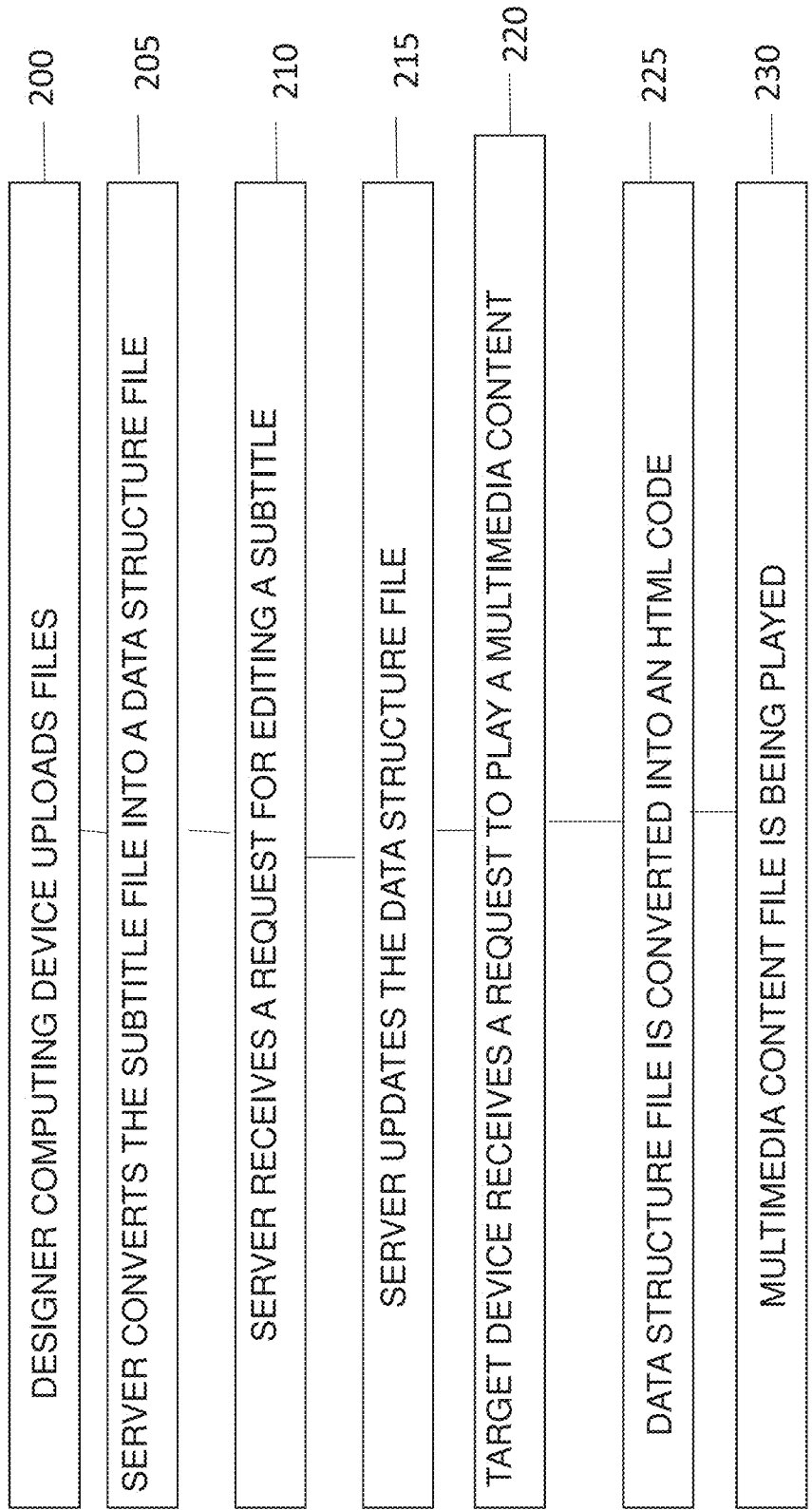
FIG. 2 shows a flowchart diagram of a scenario for separating the subtitle data from the multimedia content file, in accordance with some exemplary embodiments of the disclosed subject matter.

FIG. 2 shows a flowchart diagram of a scenario for separating the subtitles from the video file, in accordance with some exemplary embodiments of the disclosed subject matter.

According to some embodiments the system enables to change properties of the subtitle without the need to render the multimedia content file.

Refereeing now to the drawing:

Blocks 200, 205, 210 and 215 are for preparing the subtitles before playing the multimedia content.

At block 200 the designer computing device uploads the subtitle file and the multimedia content file to the server.

block 205 the server converts the subtitle file into a data structure file. In one example an SRT file is converted into a JSON object. The conversion may be performed by Java scripts.

At block 210 the server receives a request from the designer computing device for adding or updating properties to the subtitle.

At block 215 the server updates the data structure file in accordance with the request.

Blocks 220, 225 and 230 are performed for playing the multimedia content.

At block 220 the target device receives a request to play a multimedia content. As a result, the media content file, the associated data structure file and the engine are downloaded to the target computing device.

At block 225 the data structure file is converted into an HTML code. The method for converting the data structure file into an HTML code is explained in greater details in FIG. 4.

At block 230 the multimedia content file is being played. In some embodiments, the multimedia content file is being played while activating the HTML code.

FIG. 3A shows an exemplary scene of a played video before changing a property of the subtitle while playing the video in accordance with some exemplary embodiments of the subject matter, and FIG. 3B shows an exemplary scene of a played video after changing a property of the subtitle while playing the video, in accordance with some exemplary embodiments of the subject matter.

FIG. 4 shows a flowchart diagram of the method for converting a JSON object into an HTML code, in accordance with some exemplary embodiments of the subject matter.

Blocks 400, 405, 410, 415, 420 and 425 illustrate a first embodiment of conversion.

At block 400 the data structure file is converted into an HTML code. conversion is performed by Java scripts.

At block 405, the multimedia content is being played.

At block 410, while the media content is being played, the engine retrieves the current timecode of the media content. The retrieving may be performed by a java script utilizing the browser functionality.

At block 415 the engine searches in the HTML code for the subtitle that is associated with this timecode.

At block 420 the code of the HTML parts that are not associated with the current subtitle is darken.

At block 425, the HTML code is activated while the media content is being played.

Blocks 410, 415, 420 and 425 may be repeated while the media content is being played.

Blocks 430, 435, 440, and 445 illustrate a second embodiment of conversion.

At block 430, while the media content is being played, the engine retrieves the current timecode of the media content. The retrieval may be performed by a java script utilizing the browser functionality.

At block 435 the engine searches in the data structure file for the lines that are associated with the current timecode.

At block 440 the lines are converted into an HTML code.

At block 445, the HTML code is activated while the multimedia content file is being played.

FIG. 5 shows exemplary lines of data structure file and corresponding lines in JSON object, in accordance with some exemplary embodiments of the subject matter.

Line 501 of the DATA STRUCTURE file is converted into line 502 in the JSON object.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should be noted that, in some alternative implementations, the functions noted in the block of a figure may occur out of the order noted in the figures. For example, two blocks shown in succession may, in fact, be executed substantially concurrently, or the blocks may sometimes be executed in the reverse order, depending upon the functionality involved.

What is claimed is:

1. A computer-implemented method, comprising:
converting a subtitle file into a data structure file, said subtitle file being associated with a multimedia content file;
receiving a request for playing multimedia content;
as a result of said request converting said data structure file into an HTML code;
synchronizing a playing of said multimedia content file with an activating of said HTML code.

2. The method of claim 1, wherein said multimedia content file does not include subtitles.

3. The method of claim 1 further comprising: receiving a request for amending a property of a subtitle associated with said multimedia content and, as a result of said request amending said data structure file.

4. The method of claim 3 wherein said amending being while said media content is being played.

5. The method of claim 1, wherein said subtitle file being an SRT file.

6. The method of claim 1 further comprising: receiving a request for amending a style property of a subtitle associated with said multimedia content and, as a result of said request amending said data structure file to reflect said request.

7. A computing system, said computing system comprising: a memory comprising instructions executable by one or more processors; and the one or more processors coupled to the memory and operable to execute the instructions, the one or more processors being operable when executing the instructions to: converting a subtitle file into a data structure file, said subtitle file being associated with a multimedia content file; receiving a request for playing multimedia content; as a result of said request converting said data structure file into an HTML code; and synchronizing a playing of said multimedia content file with an activating of said HTML code.

* * * * *